US012368267B2

(12) United States Patent
Hossain et al.

(10) Patent No.: US 12,368,267 B2
(45) Date of Patent: Jul. 22, 2025

(54) CONNECTOR HAVING A RELEASE BUTTON

(71) Applicant: Apple Inc., Cupertino, CA (US)

(72) Inventors: Muhammad F. Hossain, Sunnyvale, CA (US); Samuel A. Resnick, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 381 days.

(21) Appl. No.: 17/898,693

(22) Filed: Aug. 30, 2022

(65) Prior Publication Data

US 2023/0081772 A1 Mar. 16, 2023

Related U.S. Application Data

(60) Provisional application No. 63/244,312, filed on Sep. 15, 2021.

(51) Int. Cl.

| | |
|---|---|
| ***H01R 13/627*** | (2006.01) |
| ***H01R 12/55*** | (2011.01) |
| ***H01R 13/502*** | (2006.01) |
| ***H01R 13/629*** | (2006.01) |

(52) U.S. Cl.

CPC ......... *H01R 13/6272* (2013.01); *H01R 12/55* (2013.01); *H01R 13/502* (2013.01); *H01R 13/629* (2013.01)

(58) Field of Classification Search

CPC .. H01R 12/55; H01R 13/6272; H01R 13/502; H01R 13/629

USPC .......................................................... 439/352

See application file for complete search history.

(56) References Cited

U.S. PATENT DOCUMENTS

| | | | | |
|---|---|---|---|---|
| 5,448,646 A | 9/1995 | Lucey et al. | | |
| 5,915,987 A | 6/1999 | Reed et al. | | |
| 6,457,987 B1 * | 10/2002 | Yeh | H01R 13/6275 | 439/352 |
| 6,953,361 B2 * | 10/2005 | Li | H01R 13/6582 | 439/607.05 |
| 7,094,089 B2 | 8/2006 | Andre et al. | | |
| 7,311,526 B2 | 12/2007 | Rohrbach et al. | | |
| 7,351,066 B2 | 4/2008 | DiFonzo et al. | | |
| 7,517,222 B2 | 4/2009 | Rohrbach et al. | | |
| 7,740,499 B1 * | 6/2010 | Willey | F41H 1/04 | 439/333 |
| 7,758,369 B2 * | 7/2010 | Miller | H01R 13/6275 | 439/910 |

(Continued)

FOREIGN PATENT DOCUMENTS

| | | |
|---|---|---|
| CN | 103877726 A | 6/2014 |
| CN | 105807425 A | 7/2016 |

(Continued)

*Primary Examiner* — Justin M Kratt

(74) *Attorney, Agent, or Firm* — Young Basile Hanlon & MacFarlane, P.C.

(57) ABSTRACT

A connector includes a housing and a release button. The housing defines a recess for receiving a latch member of a receptacle. The release button is operable to cause displacement of the latch member from the recess and has a surface that aligns with a surface portion of the housing when disconnected from the receptacle. The surface of the release button protrudes from the surface portion of the housing when the connector is connected to the receptacle to provide a visual indication that the connector is connected to the receptacle.

24 Claims, 11 Drawing Sheets

(56) References Cited

U.S. PATENT DOCUMENTS

| | | | |
|---|---|---|---|
| 7,798,831 B2 | 9/2010 | Sanford et al. | |
| 7,811,114 B2 * | 10/2010 | Gabrielsson | H01R 13/6453 439/350 |
| 7,942,678 B2 | 5/2011 | Sanford et al. | |
| 8,311,255 B2 | 11/2012 | Hankey et al. | |
| 8,401,219 B2 * | 3/2013 | Hankey | B21C 23/18 381/384 |
| 8,540,363 B2 | 9/2013 | Abreu | |
| 8,545,013 B2 | 10/2013 | Hwang et al. | |
| 8,867,758 B2 | 10/2014 | Terlizzi et al. | |
| 8,882,524 B2 | 11/2014 | Golko et al. | |
| 9,293,876 B2 | 3/2016 | Terlizzi et al. | |
| 9,445,633 B2 | 9/2016 | Tulloch et al. | |
| 9,553,625 B2 | 1/2017 | Hatanaka et al. | |
| 9,614,332 B2 * | 4/2017 | Curtin | H01R 13/665 |
| 9,660,389 B2 | 5/2017 | Gao et al. | |
| 9,768,538 B1 | 9/2017 | Tulloch et al. | |
| 9,819,127 B2 * | 11/2017 | Condo | H01R 13/707 |
| 9,822,554 B2 | 11/2017 | Gresse | |
| 9,871,319 B2 | 1/2018 | Golko et al. | |
| 9,877,549 B2 | 1/2018 | Perkins et al. | |
| 9,912,081 B2 | 3/2018 | Corona | |
| 9,927,618 B2 | 3/2018 | Allin et al. | |
| 9,929,509 B1 * | 3/2018 | Penn | H01R 13/6275 |
| 10,058,149 B1 | 8/2018 | Wittenberg et al. | |
| 10,122,117 B2 * | 11/2018 | Miller | H01R 11/282 |
| 10,146,262 B1 | 12/2018 | Magrath et al. | |
| 10,184,506 B2 | 1/2019 | Chen et al. | |
| 10,264,857 B2 | 4/2019 | Perkins et al. | |
| 10,326,235 B2 | 6/2019 | Devoe | |
| 10,367,300 B2 * | 7/2019 | Shedletsky | G04G 17/04 |
| 10,448,711 B2 * | 10/2019 | Kallman | G04B 37/1486 |
| 10,476,214 B2 | 11/2019 | Golko et al. | |
| D874,459 S | 2/2020 | Limaye et al. | |
| 10,560,775 B2 | 2/2020 | Pham | |
| 10,575,602 B2 | 3/2020 | Perkins et al. | |
| 10,594,159 B2 | 3/2020 | Bossetti et al. | |
| 10,599,101 B2 | 3/2020 | Rothkopf et al. | |
| 10,747,005 B1 | 8/2020 | Sullivan | |
| 10,761,274 B2 * | 9/2020 | Pepe | G02B 6/3825 |
| 11,026,484 B2 | 6/2021 | Perkins et al. | |
| 11,320,659 B1 | 5/2022 | Kasar et al. | |
| 2004/0101250 A1 * | 5/2004 | Vergeest | G02B 6/383 385/53 |
| 2012/0071017 A1 * | 3/2012 | Gaul | B60L 53/16 439/304 |
| 2012/0171884 A1 * | 7/2012 | Dang | H01R 13/659 439/695 |
| 2015/0349457 A1 | 12/2015 | Shariff et al. | |
| 2016/0216512 A1 | 7/2016 | Miller et al. | |
| 2016/0378071 A1 | 12/2016 | Rothkopf | |
| 2017/0094392 A1 | 3/2017 | Zörkendörfer et al. | |
| 2017/0227793 A1 | 8/2017 | Abreu | |
| 2018/0295733 A1 | 10/2018 | Wen et al. | |
| 2019/0220056 A1 | 7/2019 | Yan | |
| 2019/0227328 A1 | 7/2019 | Coatney | |
| 2020/0084533 A1 | 3/2020 | Hankey et al. | |
| 2021/0304938 A1 | 9/2021 | Kasar et al. | |
| 2024/0213724 A1 | 6/2024 | Mendoza et al. | |

FOREIGN PATENT DOCUMENTS

| | | |
|---|---|---|
| CN | 205750111 U | 11/2016 |
| CN | 206224049 U | 6/2017 |
| CN | 207440422 U | 6/2018 |
| CN | 104793338 B | 8/2018 |
| CN | 105892065 B | 8/2018 |
| CN | 105476187 B | 9/2018 |
| CN | 105376970 B | 1/2019 |
| CN | 105661735 B | 6/2019 |
| EP | 2362498 A2 | 8/2011 |
| EP | 3682756 A1 | 7/2020 |
| WO | 2017113487 A1 | 7/2017 |
| WO | 2020038004 A1 | 2/2020 |

* cited by examiner

CONNECTOR HAVING A RELEASE BUTTON

CROSS-REFERENCE TO RELATED APPLICATIONS

This application claims the benefit of U.S. Provisional Application No. 63/244,312, filed on Sep. 15, 2021, the content of which is hereby incorporated by reference herein in its entirety for all purposes.

FIELD

The present disclosure relates generally to the field of connector assemblies for electronic devices.

BACKGROUND

Some devices are configured to be connected to and disconnected from accessories. As an example, wearable devices, such as smart watches, may be configured to connect to and disconnect from a support band.

SUMMARY

A first aspect of the disclosure is a connector that includes a housing and a release button. The housing defines a recess for receiving a latch member of a receptacle. The release button is operable to cause displacement of the latch member from the recess and has a surface that aligns with a surface portion of the housing when disconnected from the receptacle. The surface of the release button protrudes from the surface portion of the housing when the connector is connected to the receptacle to provide a visual indication that the connector is connected to the receptacle.

In the first aspect, the surface of the release button may be substantially planar, the surface portion of the housing may be substantially planar, and the surface of the release button may be flush with respect to the surface portion of the housing when the connector is disconnected from the receptacle. The surface of the release button may have a curved shape, and the surface portion of the housing may have a complementary curved shape. The recess may be formed from metal so that engagement of the recess with the latch member of the receptacle produces an audible indication that the connector is connected to the receptacle. The connector may include a release mechanism that operably connects the release button to an engaging part that is located in the recess, wherein the engaging part is actuated by the latch member when the connector is connected to the receptacle, and operation of the release button causes the engaging part to displace the latch member out of the recess. The engaging part of the release mechanism may be a cover that is connected to the housing, wherein the cover is configured to obstruct the recess, and the cover is displaced into the recess by the latch member of the receptacle when the connector is connected to the receptacle. The cover may be formed from metal so that displacement of the cover by the latch member causes an audible indication that the connector is connected to the receptacle. The release mechanism may include a flexible connecting structure that extends through a flexible portion of the housing that is located between the recess and the release button, wherein the flexible connecting structure is configured to transfer movement between the engaging part and the release button. The recess may be rigid, and the housing may include a release housing portion that is rigid and supports the release button. The connector may include electrical contacts that are located on the housing and configured for conductive engagement with the receptacle when the connector is connected to the receptacle. The connector may include a circuit board that is located in the housing and is electrically connected to the electrical contacts, wherein the circuit board includes a tapered portion that is located adjacent to a flexible portion of the housing. The various features of the first aspect described in this paragraph can be implemented together or separately.

A second aspect of the disclosure is a connector that includes a housing, a release button, and a release mechanism. The housing includes a flexible portion and defines a recess for receiving a latch member of a receptacle. The release mechanism has a flexible connecting structure that extends through the flexible portion of the housing and operably connects the release button to an engaging part that is configured to displace the latch member from the recess upon operation of the release button.

In the second aspect, the flexible connecting structure may include a cable. The flexible connecting structure may include a flexible sheet material. The recess may be rigid, and the housing may include a release housing portion that is rigid and supports the release button. The flexible connecting structure may be configured to transfer movement between the engaging part and the release button. The engaging part may be displaced by the latch member when the connector is connected to the receptacle. The engaging part of the release mechanism may be a cover that is connected to the housing, wherein the cover is configured to obstruct the recess, and the cover is displaced into the recess by the latch member of the receptacle when the connector is connected to the receptacle. The connector may include electrical contacts that are located on the housing and configured for conductive engagement with the receptacle when the connector is connected to the receptacle. The various features of the second aspect described in this paragraph can be implemented together or separately.

A third aspect of the disclosure is a connector that includes a housing, a release button, and a release mechanism. The housing defines a recess for receiving a latch member of a receptacle. The release button that is operable to cause displacement of the latch member from the recess and has a surface that aligns with a surface portion of the housing when disconnected from the receptacle. The release mechanism operably connects the release button to an engaging part of the release mechanism that is located in the recess. The engaging part is actuated by the latch member when the connector is connected to the receptacle and actuation of the engaging part causes the surface of the release button to protrude from the surface portion of the housing to provide a visual indication that the connector is connected to the receptacle.

In the third aspect, the surface of the release button may be substantially planar, the surface portion of the housing may be substantially planar, and the surface of the release button may be flush with respect to the surface portion of the housing when the connector is connected to the receptacle. The surface of the release button may have a curved shape, and the surface portion of the housing may have a complementary curved shape. A flexible portion of the housing may be located between the recess and the release button, and the release mechanism may include a flexible connector that extends through the flexible portion of the housing. The connector may include electrical contacts that are located on the housing and configured for conductive engagement with the receptacle when the connector is connected to the receptacle, and the connector may include a circuit board that is located in the housing and is electrically connected to the electrical contacts, wherein the circuit board includes an open portion that is located between first and second lateral side portions that are interconnected by a central portion that supports the electrical contacts. The recess may be formed from metal, and the latch member may be formed from metal so that engagement of the recess with the latch member of the receptacle causes an audible indication of connection of the connector to the receptacle. The various features of the third aspect described in this paragraph can be implemented together or separately.

A fourth aspect of the disclosure is a connector that includes a housing that defines a recess for receiving a latch member of a receptacle, a release button that is operable to cause displacement of the latch member from the recess and has a surface that aligns with a surface portion of the housing when disconnected from the receptacle, a release mechanism that operably connects the release button to an engaging part of the release mechanism that is located in the recess. The engaging part is actuated by the latch member when the connector is connected to the receptacle and actuation of the engaging part causes the surface of the release button to protrude from the surface portion of the housing to provide a visual indication that the connector is connected to the receptacle.

In the fourth aspect, the surface of the release button may be substantially planar, the surface portion of the housing may be substantially planar, and the surface of the release button may be flush with respect to the surface portion of the housing when the connector is disconnected from the receptacle. The surface of the release button may have a curved shape, and the surface portion of the housing may have a complementary curved shape. The recess may be formed from metal so that engagement of the recess with the latch member of the receptacle produces an audible indication that the connector is connected to the receptacle. The engaging part of the release mechanism may be a cover that is connected to the housing, wherein the cover is configured to obstruct the recess, and the cover is displaced into the recess by the latch member of the receptacle when the connector is connected to the receptacle. The cover may be formed from metal so that displacement of the cover by the latch member causes an audible indication that the connector is connected to the receptacle. The housing may include a flexible portion that is located between the recess and the release button. The release mechanism may include a flexible connecting structure that extends through the flexible portion of the housing and operably connects the release button to the engaging part of the release mechanism. The flexible connecting structure may include a cable. The flexible connecting structure may include a flexible sheet material. The recess may be rigid, and the housing may include a release housing portion that is rigid and supports the release button. The flexible connecting structure may be configured to transfer movement between the engaging part and the release button. The connector may include electrical contacts that are located on the housing and configured for conductive engagement with the receptacle when the connector is connected to the receptacle. The connector may include a circuit board that is located in the housing and is electrically connected to the electrical contacts, wherein the circuit board includes a tapered portion that is located adjacent to a flexible portion of the housing. The connector may include a circuit board that is located in the housing and is electrically connected to the electrical contacts, wherein the circuit board includes an open portion that is located between first and second lateral side portions that are interconnected by a central portion that supports the electrical contacts. The various features of the fourth aspect described in this paragraph can be implemented together or separately.

DETAILED DESCRIPTION

The disclosure herein relates to a device that is connectable to an accessory using a connector assembly that includes a receptacle and a connector. Visual and/or audible indicators are provided that allow the user to understand whether the accessory has been fully and securely connected to the device, which may be otherwise difficult to ascertain. For example, it may be difficult to ascertain whether the accessory is fully and securely connected to the device if the device and/or the accessory has a complex geometry that lacks clear visual markers that allow the user to judge a depth of insertion of a connector into a receptacle. The disclosure herein also relates to structures by which flexibility of a flexible structure may be maintained while incorporating a connector. The disclosure herein also relates to connectors having configurations that improve the efficiency of packaging components of the connector in a housing.

Figure 1A:
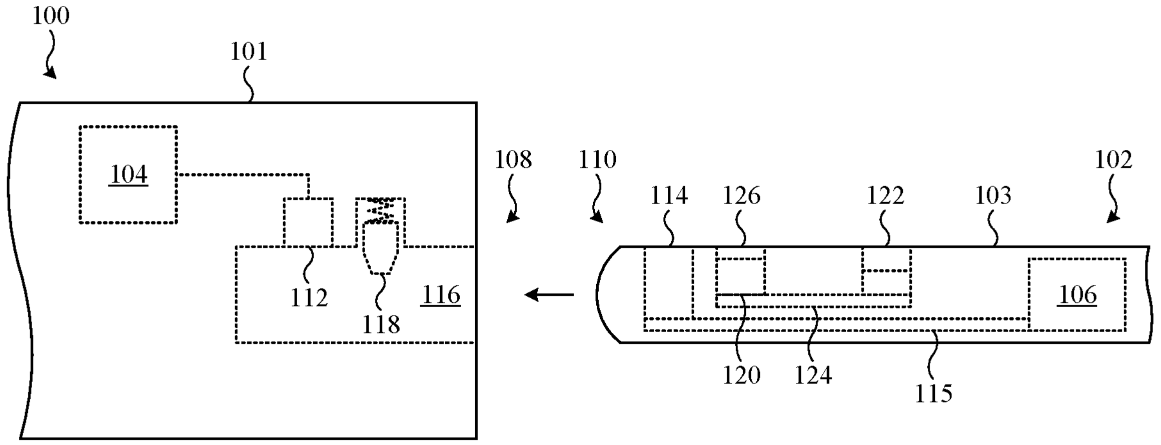
FIG. 1A is a schematic illustration of a system showing a device and an accessory in a disconnected position.
Figure 1B:
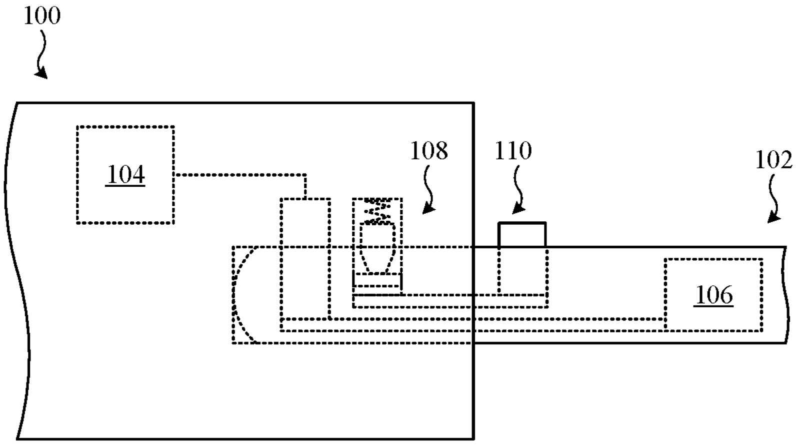
FIG. 1B is a schematic illustration of the system showing the device and the accessory in a connected position.

FIGS. 1A-1B are schematic illustrations of a system that includes a device 100 and an accessory 102. In FIG. 1A, the device 100 and the accessory 102 are depicted in a disconnected position. In FIG. 1B, the device 100 and the accessory 102 are depicted in a connected position, in which the accessory 102 is mated with the device 100. The connected position may include a structural connection of the accessory 102 to the device 100 and an electrical connection of the accessory 102 to the device 100.

The device 100 is an electronic device that is configured to perform one or more functions. These functions may include, as examples, displaying content, playing audio, or obtaining information using sensors. The device 100 may be a wearable electronic device that is configured to be worn by a user. As examples, the device 100 may be a smart watch, a fitness tracker, a near-eye display device such as smart glasses or a head-mounted computer generated reality device, or another type of device that includes components that support a particular functionality. The accessory 102 is connectable to the device 100 in order to augment or enhance the functionality of the device 100. As one example, the accessory 102 may enhance the device 100 by including components that define part of a support structure or all of a support structure, such as a wrist band or a head band, that allows the user to wear the device 100. As another example, the accessory 102 may include components that are usable with components of the device 100 to augment the functionality of the device 100.

The device 100 includes a device housing 101 (which may be referred to as a device housing, a body, a device body, etc.), which is a single part or multi-part structure that is configured to support and structurally interconnect various components of the device 100. The accessory 102 includes a housing 103 (which may be referred to as an accessory housing, a body, an accessory body, etc.), which is a single part or multi-part structure that is configured to support and structurally interconnect various components of the accessory 102.

The housing 103, or at least part of the housing 103, may be formed from a flexible material such as a flexible plastic. As an example, at least part of the housing 103 may be formed from silicone rubber. Thus, the housing 103 may include a flexible part of the housing 103 which is formed from a flexible material. The flexible part of the housing 103 may be configured to allow the housing 103 to flex (e.g., bend) in at least one degree of freedom. This flexibility may allow the housing 103 to better conform to a user's body in implementations in which the accessory 102 forms part of a support structure for a wearable device.

The device 100 includes components 104 (which may be referred to as device components), which are components that implement features of the device 100. Some of the components 104 may be electrical components, which may be referred to herein as device electrical components. The components 104 are connected to and supported by the device housing 101, and may be positioned inside or outside of the device housing 101. Specific examples of the components 104 are described further herein.

The accessory 102 includes components 106 (which may be referred to as accessory components), which are components that enhance the functionality of the accessory 102. Some of the components 106 may be electrical components, which may be referred to herein as accessory electrical components. The components 106 of the accessory 102 may function independent of the components 104 of the device 100, or may interoperate, such as by operating dependent upon commands from the components 104 of the device 100, sending information (e.g., sensor signals) to the components 104 of the device 100, and/or by supplying electrical power to the components 104 of the device 100.

The accessory 102 is movable between a connected position and a disconnected position with respect to the device 100. To allow connection and disconnection, the device 100 includes a receptacle 108 and the accessory includes a connector 110. Together, the receptacle 108 and the connector 110 define a connector assembly that is configured to connect the accessory 102 to the device 100. The accessory 102 (inclusive of the connector 110) is in the disconnected position when the accessory 102 is not connected to the device 100, and being in the disconnected position does not imply that the accessory 102 was previously connected to the device 100. Thus, the accessory 102 may be in the disconnected position relative to the device 100 without ever having been connected to the device 100.

The receptacle 108 and the connector 110 are structural components that are engageable with each other to mate the connector 110 to the receptacle 108 and thereby secure the accessory 102 to the device 100 in the connected position. The receptacle 108 and the connector 110 are releasable from each other in order to disengage the connector 110 from the receptacle 108 and thereby allow the connector 110 to move from the connected position to the disconnected position. However, to ensure that the accessory 102 remains securely attached to the device 100 during use, the receptacle 108 and the connector 110 may remain locked in mutual engagement until a user acts to cause disconnection, such as by manual operation of a button, a switch, a slide, or other structure, as will be discussed further herein. Thus, the connector 110 of the accessory 102 is connectable to a corresponding connector of the device 100, such as the receptacle 108 in the illustrated implementation, in order to connect the accessory 102 to the device 100.

To electrically connect the accessory 102 to the device 100, the receptacle 108 includes electrical contacts 112, and the connector 110 includes electrical contacts 114. The electrical contacts 112 of the receptacle 108 and the electrical contacts 114 of the connector 110 are complementary components or sets of components that are electrically conductive and are configured to engage one another when the accessory 102 is in the connected position with respect to the device 100. The electrical contacts 112 and the electrical contacts 114 may be implemented using conventional components, such as conductive pads or conductive pins. As will be described further herein, the electrical contacts 114 of the connector 110 may be supported by a circuit board 115 that is located in the housing 103 of the accessory 102.

Some of the components 104 and the components 106 are electrical components that may be electrically connected to the electrical contacts 112 and the electrical contacts 114, respectively. Thus, in the connected position, electrical connection of the electrical contacts 112 and the electrical contacts 114 allows electrical communication (e.g., including transmission of electrical power, signals, and/or data) between the components 104 and the components 106.

The receptacle 108 of the device 100 includes an interior 116, which is an open space that has an open end, and is configured to receive the connector 110 of the accessory 102 during insertion of the connector 110 into the receptacle 108 to define the connected position. The connector 110 also includes a latch member 118 that is located in the interior 116 and is configured to engage the connector 110 in the connected position. As an example, the latch member 118 may be a spring biased tooth.

The connector 110 includes a recess 120, a release button 122, a release mechanism 124, and an engaging part 126. To mate the connector 110 with the receptacle 108, the recess 120 is configured for engagement with a portion of the receptacle 108, such as the latch member 118. The release mechanism 124 operably connects the release button 122 to the engaging part 126 to allow disconnection of the connector 110 from the receptacle 108.

Figure 2A:
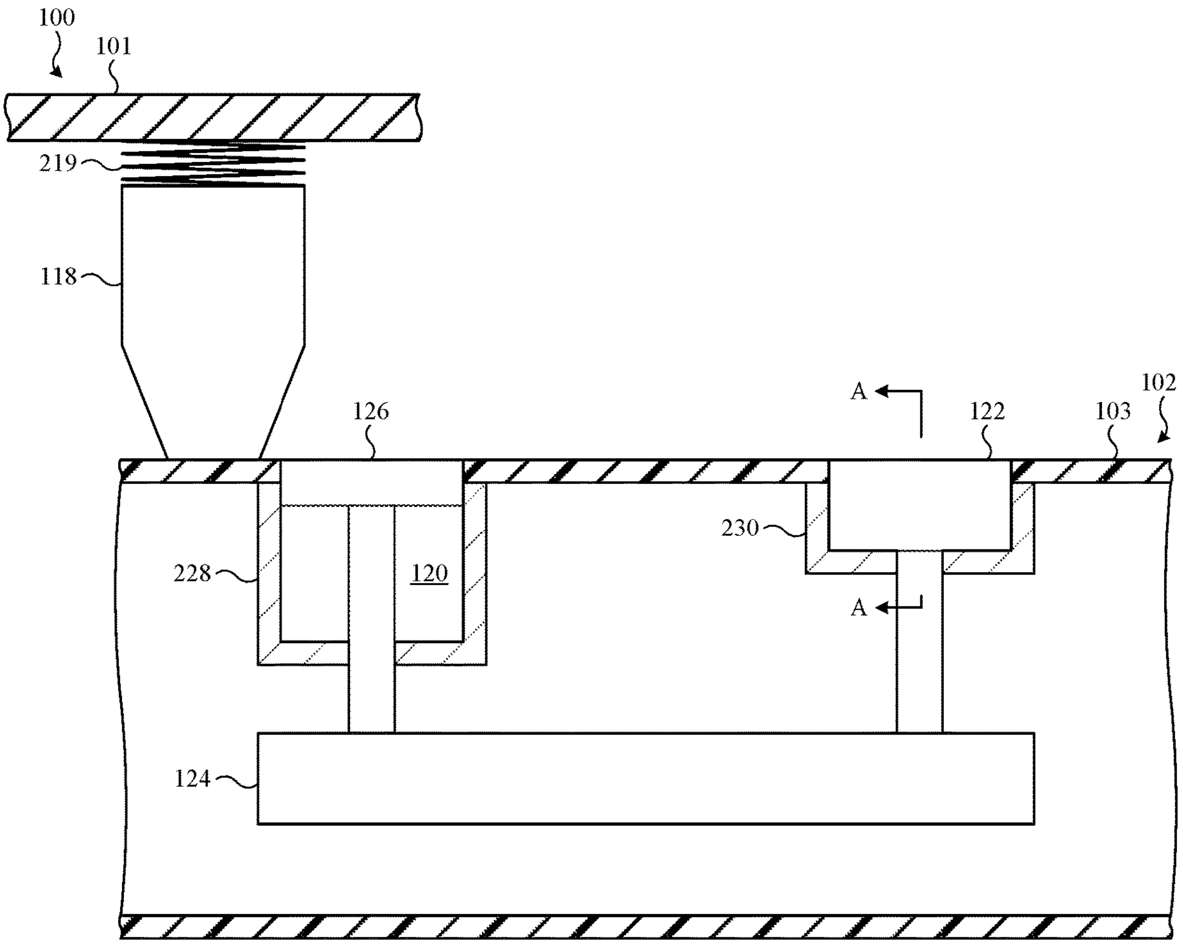
FIG. 2A is a schematic cross-section illustration of a connector of the accessory and a portion of a receptacle of the device.
Figure 2B:
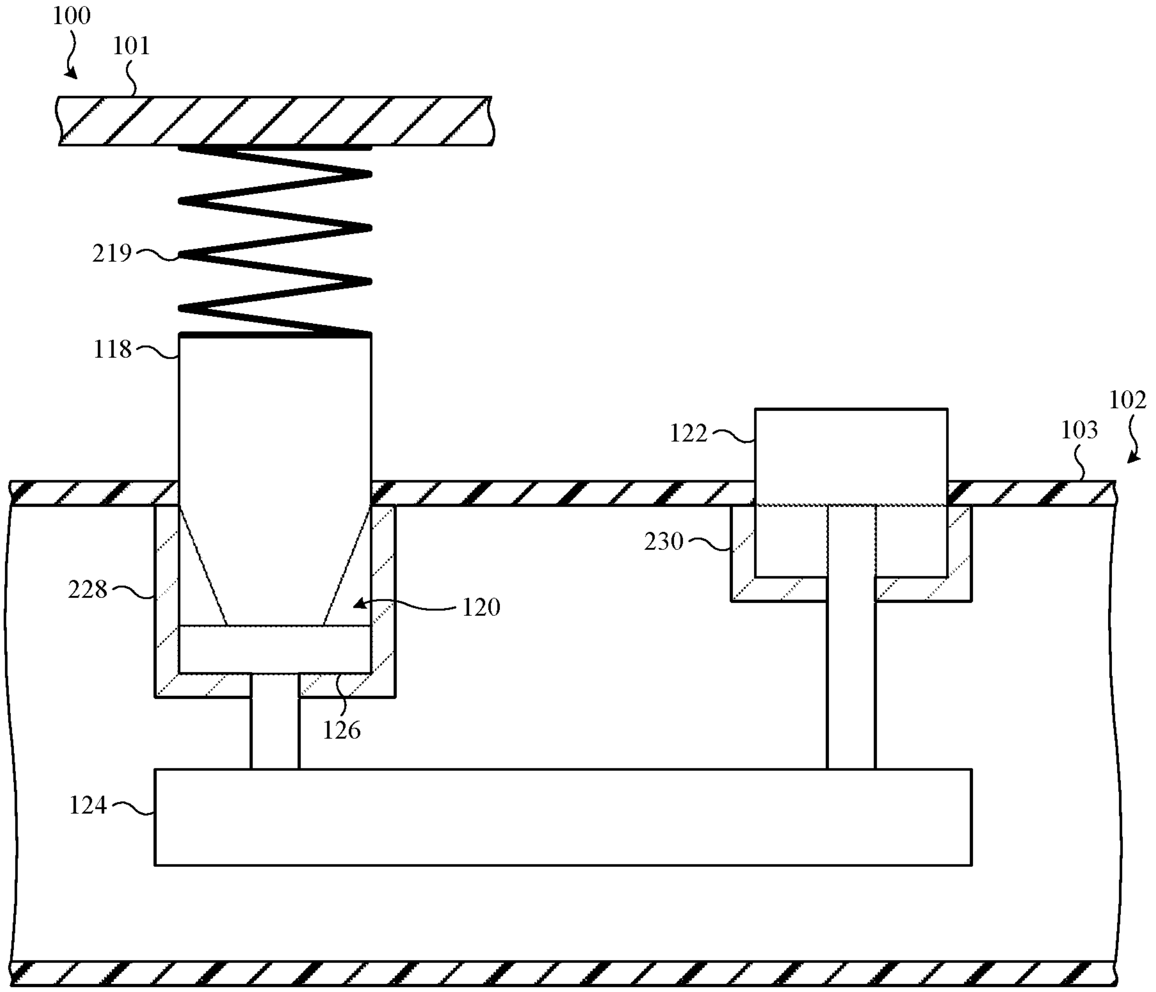
FIG. 2B is a schematic cross-section illustration of the connector of the accessory engaged with a portion of the receptacle of the device.
Figure 2C:
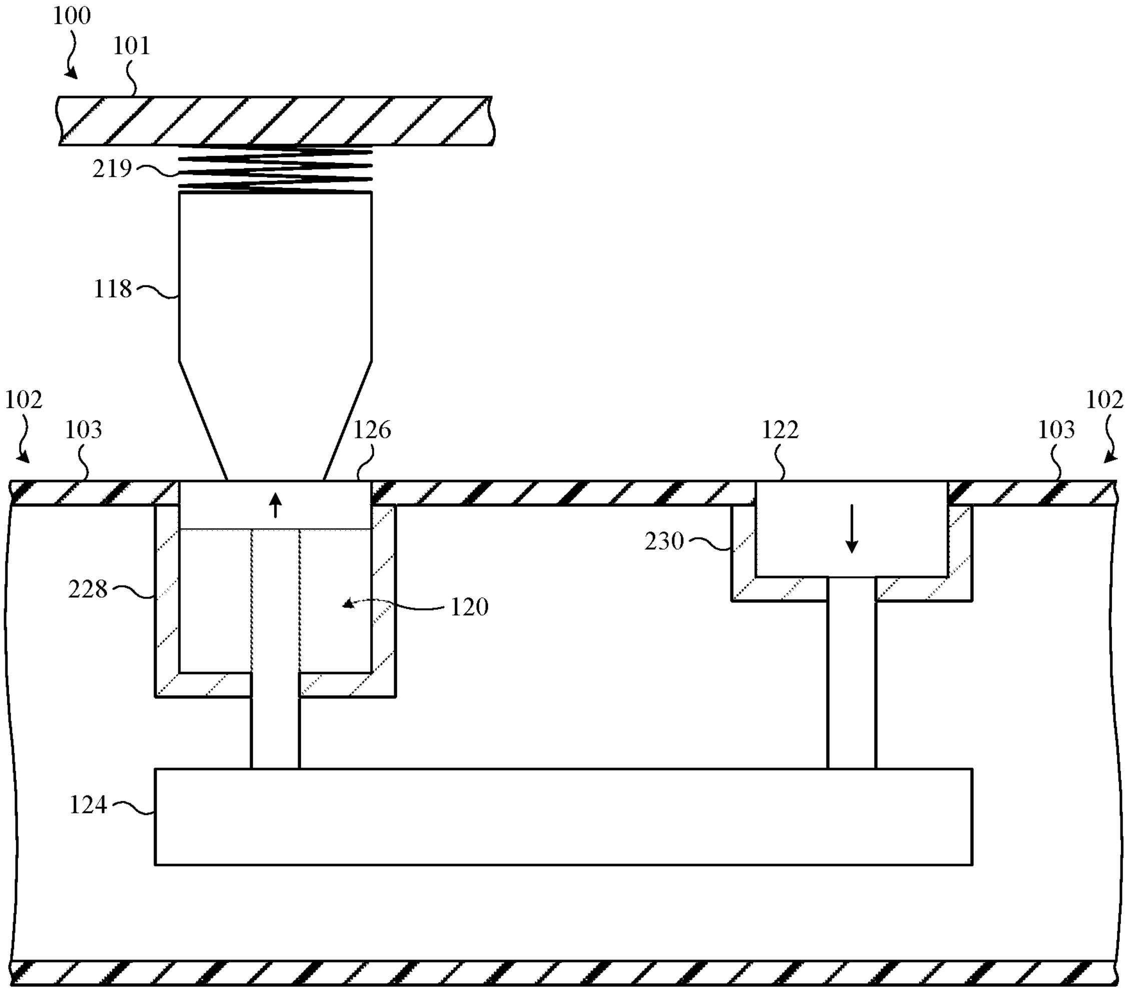
FIG. 2C is a schematic cross-section illustration showing operation of a release button of the connector.

FIGS. 2A-2C are show connection and disconnection of connector 110 and the receptacle 108. FIG. 2A is a schematic cross-section illustration of a portion of the connector 110. FIG. 2B is a schematic cross-section illustration of a portion of the connector 110 engaged with a portion of the receptacle 108. FIG. 2C is a schematic cross-section illustration showing operation of the release button 122 of the connector 110.

The recess 120 may be defined by the housing 103 or a portion of component thereof, such as a recess housing portion 228. The recess 120 is configured to engage part of the receptacle 108 to resist movement from the connected position to the disconnected position and thus maintain connection of the accessory 102 to the device 100. In the illustrated implementation, the recess 120 is configured for receiving the latch member 118 of the receptacle 108 so that engagement of the recess 120 with the latch member 118 prevents the connector 110 from moving out of the interior 116 of the receptacle 108.

The recess 120 of the connector 110 may be configured to provide an audible indication that the connector 110 is connected to the receptacle 108. By forming the recess housing portion 228 from a rigid material, and by also forming the latch member 118 from a rigid material, an audible sound may be produced by engagement of the latch member 118 with the recess housing portion 228, wherein the audible sound is of sufficient volume and character to be perceived by the user and serve as an audible indication that the connector 110 is connected to the receptacle 108.

In some implementations, the recess housing portion 228 and/or the latch member 118 are formed from metal in order to enhance the volume and character of the audible indication that the connector 110 is connected to the receptacle 108 that results from engagement of the latch member 118 and the recess housing portion 228. Thus, in some implementations, the housing 103 of the accessory 102 includes the recess housing portion 228, which is formed from a rigid metal such as metal and defines the recess 120 so that engagement of recess housing portion 228 with the latch member 118 of the receptacle 108 causes an audible indication of connection of the connector 110 to the receptacle 108.

Additional types of audible indications of connection may be provided. As one example, a sensor that is associated with the receptacle 108 or the connector 110 may sense that the connector 110 is fully connected to the receptacle. In response to sensing full connection of the connector 110 to the receptacle 108, an audio output component that is associated with the device 100 or the accessory 102 may be used to output a sound (e.g., a digital sound effect played by a controller that outputs a signal corresponding to the sound to the audio output component) that can be heard by the user and perceived as an audible indication that the connector 110 is fully connected to the receptacle 108. Other implementations are possible.

The housing 103 may also include a release housing portion 230 that is rigid and supports the release button 122. In implementations that include the recess housing portion 228 and the release housing portion 230, other portions of the housing 103 may be flexible (e.g., formed from a flexible material such as silicone rubber). In the illustrated implementation, the housing 103 includes a flexible portion that extends at least between the recess 120 and the release button 122, and more particularly, between the recess housing portion 228 and the release housing portion 230. By utilizing rigid structures for the recess housing portion 228 and the release housing portion 230 while forming other parts of the housing 103 as flexible portions, some degree of flexibility of the accessory 102 may be provided while also allowing for a robust connection of the accessory 102 to the device 100.

To allow disconnection of the connector 110 from the receptacle, the release button 122 is connected to the release mechanism 124, which includes the engaging part 126. The engaging part 126 functions to displace the latch member 118 from the recess 120 when the release button 122 is operated to cause the latch member 118 to move out of the recess 120. The engaging part 126 may be located in the recess 120 or may move into the recess 120 in response to operation of the release button 122. The engaging part 126 is operated by the release button 122, and the release mechanism 124 operably connects the release button 122 to the engaging part 126 to transfer motion between the release button 122 and the engaging part 126. Conventional structures may be used to implement the release mechanism 124 in a manner that allows it to transfer motion between the engaging part 126 and the release button 122. As examples, the release mechanism 124 may be or include a linkage, a lever, a cam, a cord, a cable, a gear train, a powered actuator, a magnetic device, and/or other mechanical components that are able to transfer motion between components. Operation of the release button 122, the release mechanism 124, and the engaging part 126 will be described further herein.

In the illustrated implementation, the engaging part 126 of the release mechanism 124 is a cover that is connected to the housing 103. When implemented as a cover, the engaging part 126 is configured to obstruct the access to the recess when the connector 110 is not mated with the receptacle 108, and the engaging part 126 (i.e., implemented as a cover) is displaced into the recess 120 by the latch member 118 of the receptacle 108 when the connector 110 is mated with the receptacle 108. As described with respect to the recess housing portion 228, the engaging part 126 may be a cover that is formed from a rigid material, such as metal, to provide an audible indication of connection of the connector 110 to the receptacle 108. Thus, when the latch member 118 (which is also formed from a rigid material such as metal) engages the cover defined by the engaging part 126 during movement from the disconnected position to the connected position, this engagement causes the audible indication of connection. Thus, displacement of the cover by the latch member 118 causes an audible indication of connection of the connector 110 to the receptacle 108.

As shown in FIGS. 1B and 2B, in the connected position, the accessory 102 is at located in (e.g., at least partially) the interior 116 of the receptacle 108 so that latch member 118 may extend into the recess 120 of the connector 110 so that the connector 110 is engageable with the latch member 118 to prevent the connector 110 from moving out of the receptacle 108. As shown in FIG. 2B, the engaging part 126 has been engaged by the latch member 118 during movement from the disconnected position to the connected position and the latch member 118, which is biased by a biasing structure such as a spring 219, has displaced the engaging part 126 and moved into the recess 120. By causing movement of the engaging part 126, the latch member 118 actuates the engaging part 126, and this actuation causes outward movement of the release button 122 as a result of transfer of the motion of the engaging part 126 to the release button 122 by the release mechanism 124. In this position, the latch member 118 extends into the recess and engages part of the accessory 102, such as the recess housing portion 228 of the housing 103 of the accessory 102. By this engagement, the accessory 102 is retained in the connected position, remains mated with the device 100, and restrained from moving toward the disconnected position. In implementations in which the engaging part 126 is a cover, the cover is displaced into the recess 120 during movement of the latch member 118 into the recess 120.

To allow disconnection of the accessory 102 from the device 100, the release button 122 may be operated by a user, as shown in FIG. 2C. The release button 122 is configured, when operated, to release engagement of the latch member 118 from the recess 120 of the connector 110. To release engagement of the latch member 118, manual operation of the release button 122 causes the engaging part 126 to displace the latch member 118 and thereby cause the latch member 118 to move out of the recess 120, to disconnect the accessory 102 from the device 100 by transfer of motion between the release button 122 and the engaging part 126. In the illustrated implementation, in which the engaging part 126 is configured as a cover, the cover moves in the recess 120 toward the surface of the housing 103 of the accessory 102 in response to operation of the release button 122. This movement of the engaging part 126 displaces the latch member from the recess 120 and the connector 110 may then be moved out of and disengaged from the receptacle 108.

In the illustrated implementation, the release button 122 is a manually operated device that may be located on the exterior of the housing 103. In alternative implementations a release may instead be a switch, slide, knob, or other structure that is located on the of the housing 103, or instead located in the housing 103 and operated by a tool through an aperture, or operated in another way.

In an alternative implementation, the recess 120 may be omitted, and the latch member 118 may be part of the accessory 102 and configured to engage a corresponding feature of the device 100, such as a feature formed in the interior 116 of the receptacle. In such an implementation, the release button 122 may be operable to cause retraction of the latch member 118 from engagement with the device. Alternatively, the release button 122 may be part of the device 100 and operably connected to the latch member 118 to cause disengagement of the latch member 118 from the accessory 102.

Figure 3A:
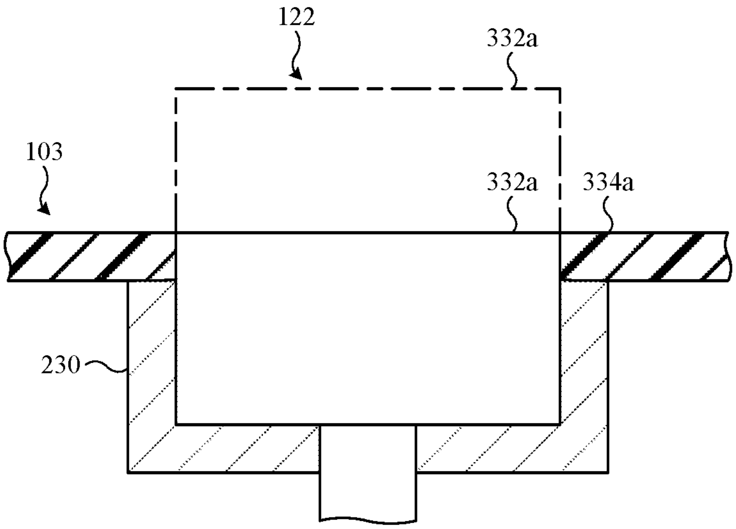
FIGS. 3A-3B are schematic cross-section illustrations taken along line A-A of FIG. 2A that show examples of the release button.
Figure 3B:
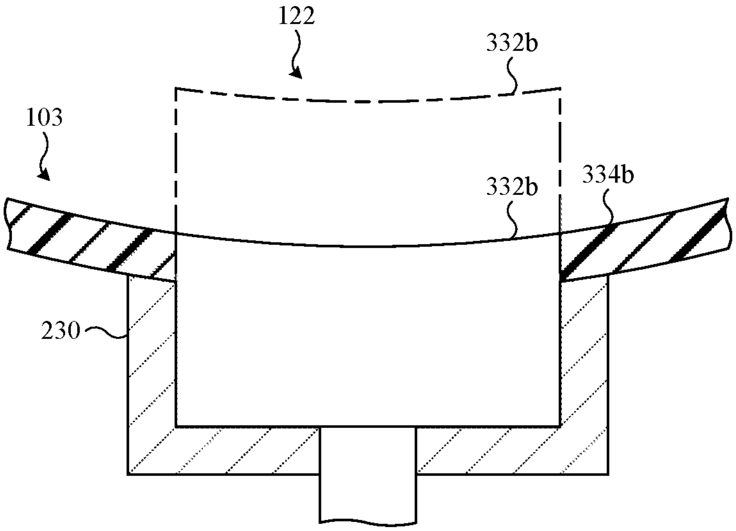

The connector 110 may be configured to provide a visual indication of connection of the connector 110 to the receptacle 108. As one example, by transfer of motion from the engaging part 126 to the release button 122, the release button 122 moves when the connector 110 of the accessory 102 is mated with the receptacle 108 of the device 100. FIGS. 3A-3B are schematic cross-section illustrations taken along line A-A of FIG. 2A that show examples of the release button 122 when the connector 110 is in the disconnected position (with the release button 122 depicted in solid lines) and when the connector 110 is in the connected position (with release button 122 depicted in dashed lines).

To provide the visual indication of connection, a surface 332*a*, 332*b* of the release button 122 aligns with (e.g., is aligned with) a surface portion 334*a*, 334*b* of the housing 103 of the accessory 102 prior to insertion of the connector 110 into the receptacle 108 (e.g., when the connector 110 is in the disconnected position), and the surface 332*a*, 332*b* of the release button 122 protrudes from the surface portion 334*a*, 334*b* of the housing 103 when the connector 110 is mated with the receptacle 108 to provide a visual indication that the connector 110 is mated with the receptacle 108. As previously described, the movement of the release button 122 is caused by engagement of the receptacle 108 (e.g., the latch member 118 of the receptacle 108) with the engaging part 126 of the release mechanism 124, and this motion is transferred to the release button 122 to raise the release button 122 relative to the surface portion 334*a*, 334*b* of the housing 103.

The geometric configuration of the housing 103 and the release button 122 may vary. In FIG. 3A, the surface 332*a* of the release button 122 is substantially planar, the surface portion 334*a* of the housing 103 is substantially planar, and the surface 332*a* of the release button 122 is flush with respect to the surface portion 334*a* of the housing 103 when the connector 110 is not mated with the receptacle 108. In FIG. 3B, the surface 332*b* of the release button 122 has a curved shape, and the surface portion 334*b* of the housing 103 has a complementary curved shape, with the surface 332*b* and the surface portion 334*b* being positioned to define a substantially continuous curved surface with respect to each other when the connector 110 is not mated to the receptacle 108. The positions of the release button 122 shown in dashed lines in FIGS. 3A and 3B represent the position of the release button 122 when the connector 110 is mated with the receptacle 108 and these positions are configured to provide a visual indication that confirms the connection.

Additional types of visual indications of connection may be provided. As one example, a sensor that is associated with the receptacle 108 or the connector 110 may sense that the connector 110 is fully connected to the receptacle 108. In response to sensing full connection of the connector 110 to the receptacle 108, a controller may control an illuminable component to provide a visual indication of connection. As one example, a light near a component of the connector 110 may be illuminated. As another example, display components (e.g., a display screen) that are associated with one of the device 100 or the accessory 102 may flash momentarily to provide a visual indication confirming that the connector 110 is fully connected to the receptacle 108 in response to sensing connection of the connector 110 to the receptacle 108 using the sensor. Other implementations of visual indications of connection are possible.

Figure 4A:
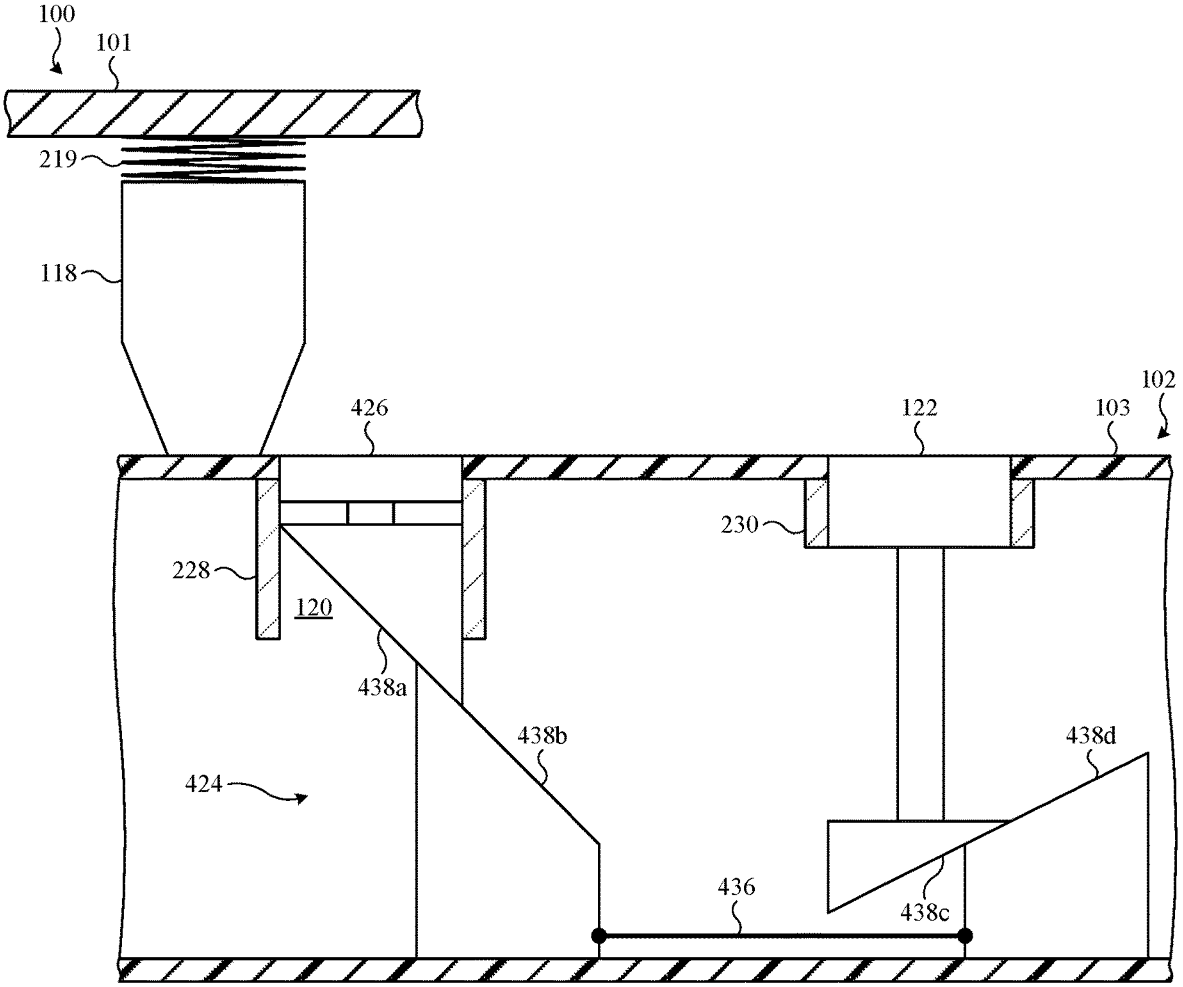
FIGS. 4A-4C are schematic cross-section illustrations of the connector of the accessory including a release mechanism according to an alternative implementation.
Figure 4B:
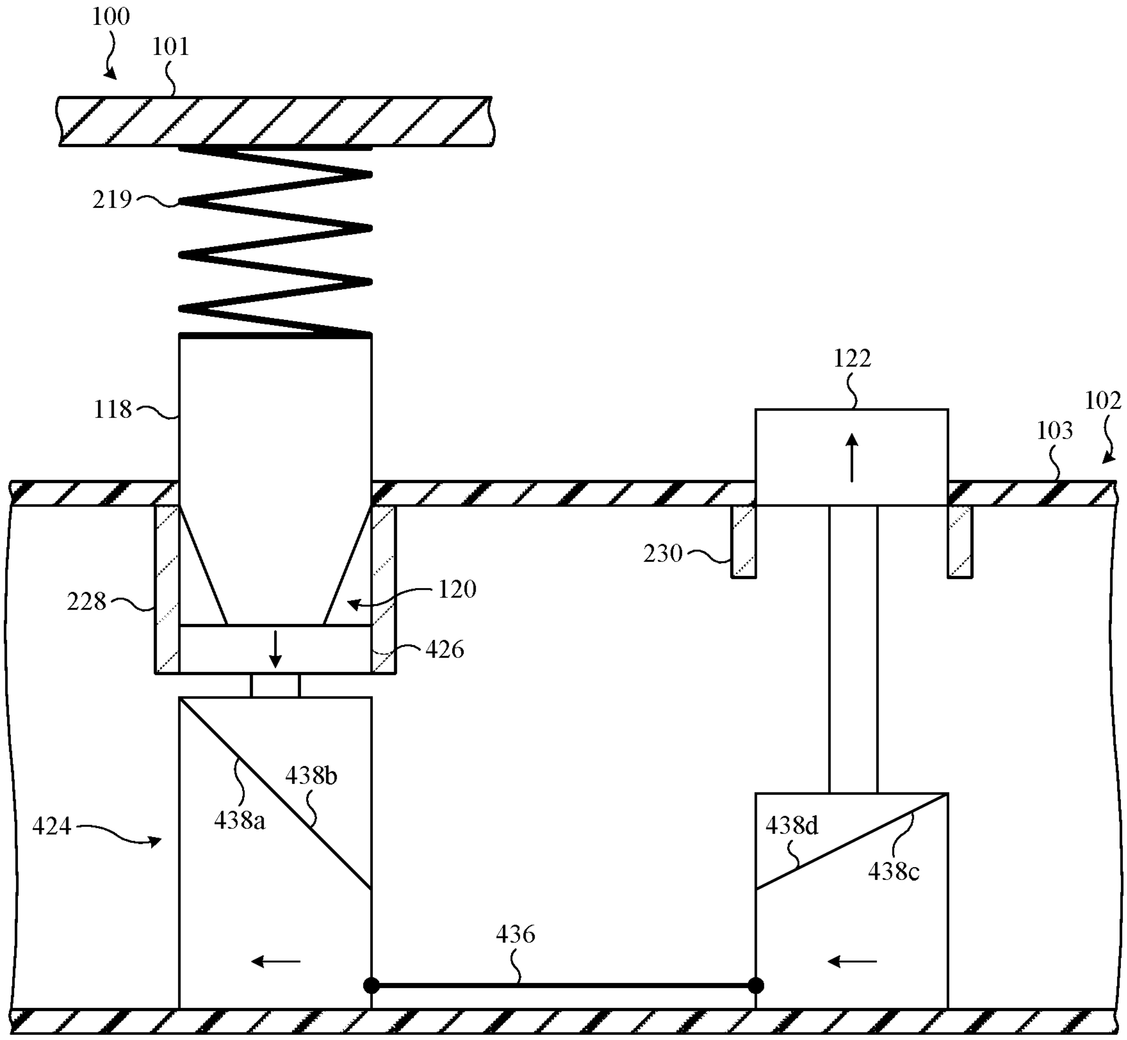
Figure 4C:
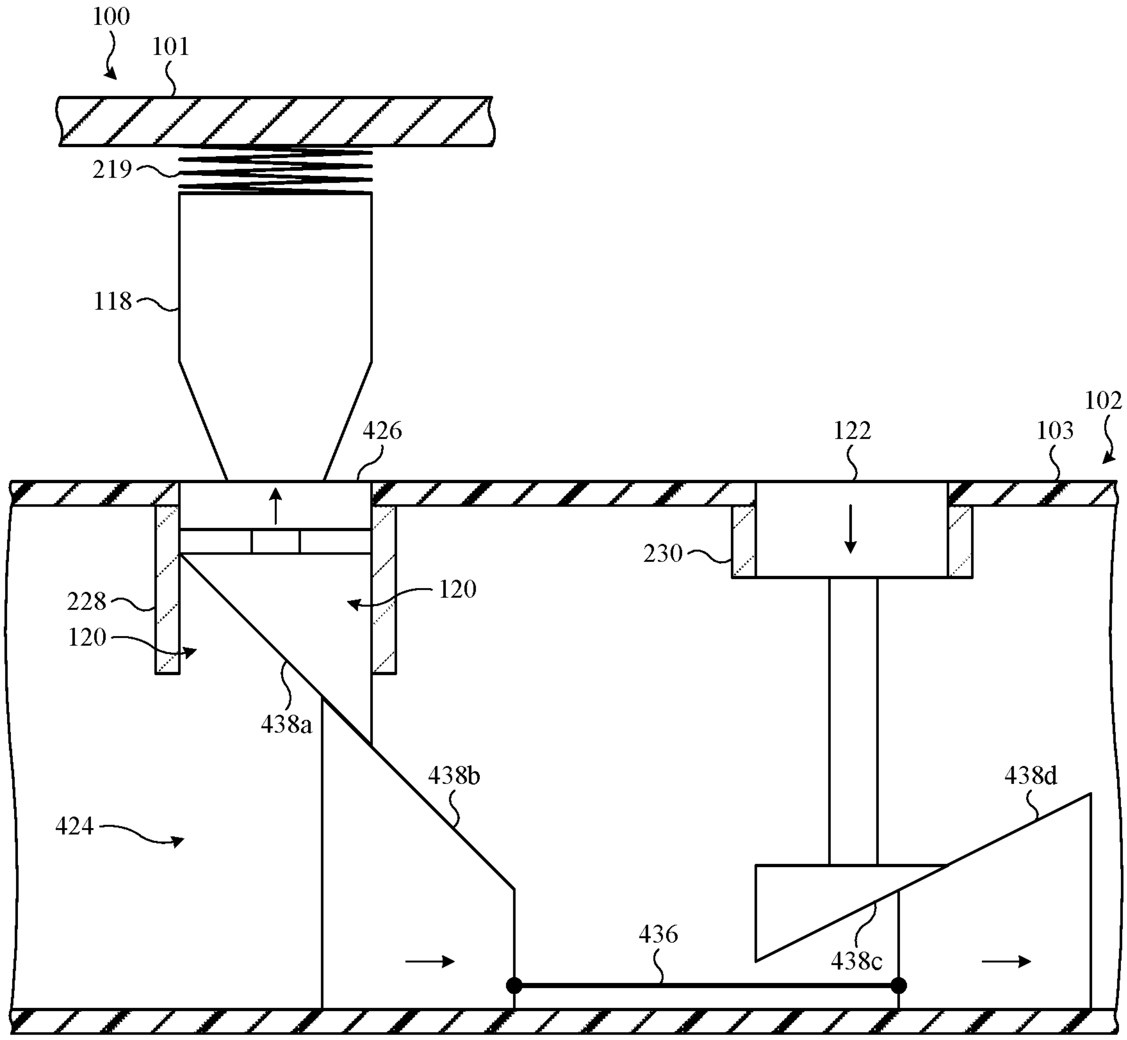

FIGS. 4A-4C show connection and disconnection of connector 110 and the receptacle 108 according to an alternative implementation in which the connector 110 includes a release mechanism 424 instead of the release mechanism 124. FIG. 4A is a schematic cross-section illustration of a portion of the connector 110 and a portion of the receptacle 108 in a disconnected position prior to mating of the connector 110 with the receptacle 108. FIG. 4B is a schematic cross-section illustration of a portion of the connector 110 engaged with a portion of the receptacle 108. FIG. 4C is a schematic cross-section illustration showing operation of the release button 122 of the connector 110. The release mechanism 424 may be implemented in according with the description of the release mechanism 124 except as otherwise stated herein, and other components are as previously described.

In this implementation, the housing 103 includes a flexible portion that extends at least between the recess 120 and the release button 122. To maintain flexibility in this area of the housing 103, the release mechanism 424 has a flexible connecting structure that, in the form of a cable 436, that extends through the flexible portion of the housing 103 and operably connects the release button 122 to an engaging part, which in this implementation is a cover 426, that is configured to move the latch member 118 out of the recess 120 upon operation of the release button 122. The cover 426 functions as an engaging part that may be implemented according to the description of the engaging part 126. The cable 436 is flexible in at least one degree of freedom to allow resilient bending of the housing 103 in the area between the recess 120 and the release button 122. As an example, the cable 436 may be a push-pull cable. A single cable or multiple cables equivalent to the cable 436 may be included. Thus, the flexible connecting structure defined by the cable 436 is configured to transfer movement between an engaging structure, such as the cover 426, and a release actuator, such as the release button 122.

The release mechanism 424 transfers motion between the cover 426 and release button 122 using a first ramp 438*a*, a second ramp 438*b*, a third ramp 438*c*, and a fourth ramp 438*d*. Movement of the ramps 438*a*-438*d* will be described with respect to the directions depicted in FIGS. 4A-4C (e.g., up, down, left, right), but it should be understood that the components of the release mechanism 424 may be configured according to a number of different orientations.

The first ramp 438*a* is connected to the cover 426 so that it moves in unison with the cover 426. The second ramp 438*b* is configured to engage the first ramp 438*a* so that upward and downward translation of the cover 426 causes a corresponding translation of the second ramp 438*b* in a longitudinal direction of the connector 110 (e.g., in the left-right direction as illustrated). Conversely, translation of the second ramp 438*b* also causes translation of the first ramp 438*a* and the cover 426. As an example, the first ramp 438*a* and the second ramp 438*b* may be configured as inclined surfaces having complementary geometric configurations that engage each other.

The third ramp 438*c* is connected to the release button 122 so that it moves in unison with the release button 122. The fourth ramp 438*d* is configured to engage the third ramp 438*c* so that upward and downward translation of the cover 426 causes a corresponding translation of the fourth ramp 438*d* in a longitudinal direction of the connector 110 (e.g., in the left-right direction as illustrated). Conversely, translation of the fourth ramp 438*d* also causes translation of the third ramp 438*c* and the release button 122. As an example, the third ramp 438*c* and the fourth ramp 438*d* may be configured as inclined surfaces having complementary geometric configurations that engage each other.

The cable 436 connects the second ramp 438*b* to the fourth ramp 438*d*. As a result, the second ramp 438*b* and the fourth ramp 438*d* translate in unison in the longitudinal direction of the housing 103. As a result of this connection, when the latch member 118 displaces the cover 426 into the recess 120, the first ramp 438*a* moves downward. This causes translation of the second ramp 438*b* due to engagement of the first ramp 438*a* with the second ramp 438*b*, which in turn causes translation of the fourth ramp 438*d* because of the cable 436. Longitudinal translation of fourth ramp 438*d* causes upward translation of the third ramp 438*c* to raise the release button 122 relative to the housing 103, as seen in FIG. 4B. When the release button is depressed, the third ramp 438*c* translates downward, which causes longitudinal translation of the second ramp 438*b* and the fourth ramp 438*d*, which causes upward translation of the first ramp 438*a* and the cover 426 to displace the latch member 118 out of the recess 120, as seen in FIG. 4C.

Figure 5:
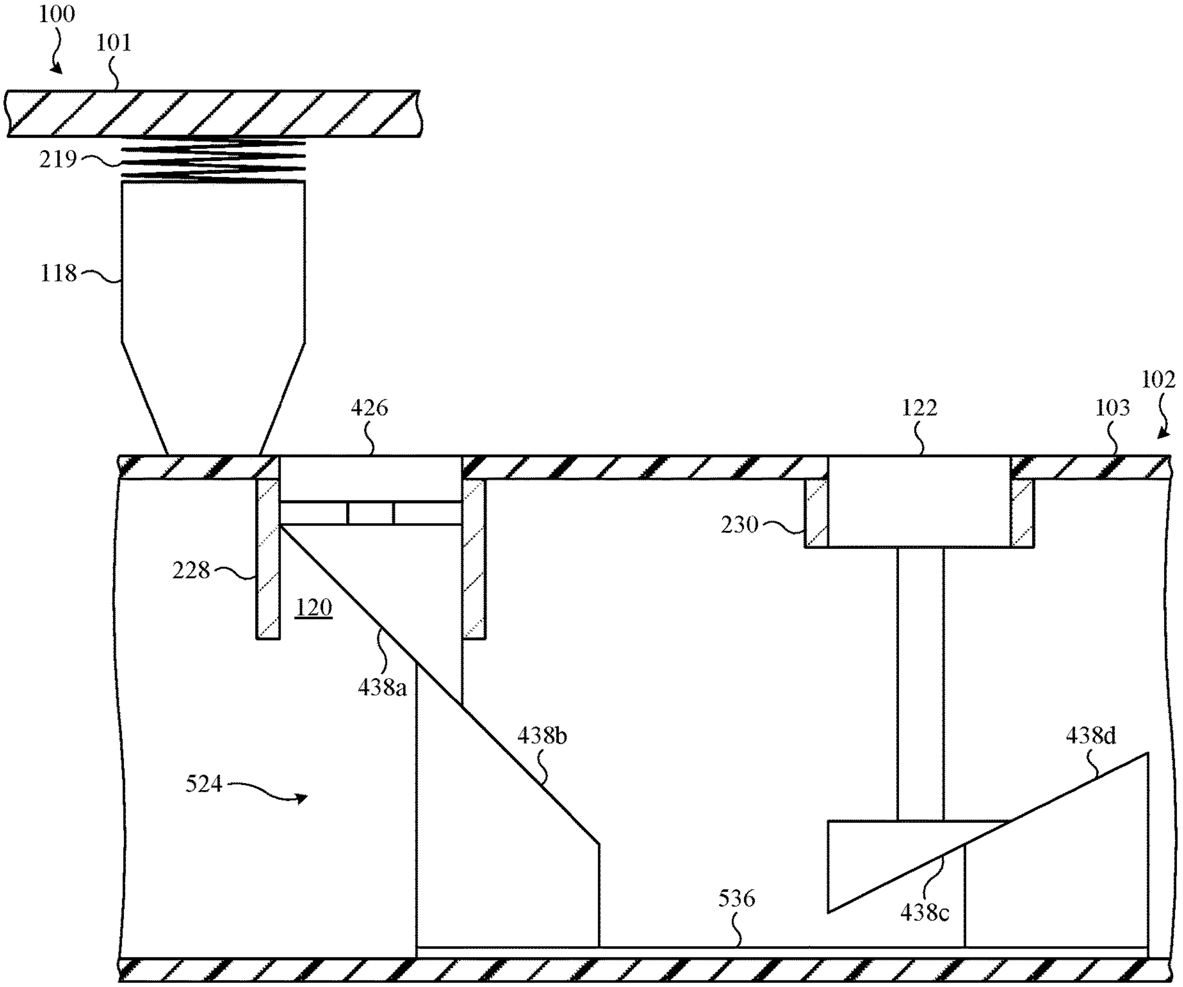
FIG. 5 is a schematic cross-section illustration of a connector of the accessory including a release mechanism according to an alternative implementation.

FIG. 5 is an illustration of the connector 110 including a release mechanism 524 according to an alternative implementation. The release mechanism is identical to the release mechanism 424 except that the cable 436 is replaced by a flexible sheet material 536, such a thin, resilient metal (e.g., spring steel), that is configured to flex resiliently in at least one degree of freedom to maintain flexibility of at least part of the housing 103 (e.g., a flexible housing portion between the cover 426 and the release button 122). The flexible sheet material 536 is connected to the second ramp 438*b* and the fourth ramp 438*d* to transfer movement between the second ramp 438*b* and the fourth ramp 438*d*, and consequently between the cover 426 and the release button 122.

Figure 6A:
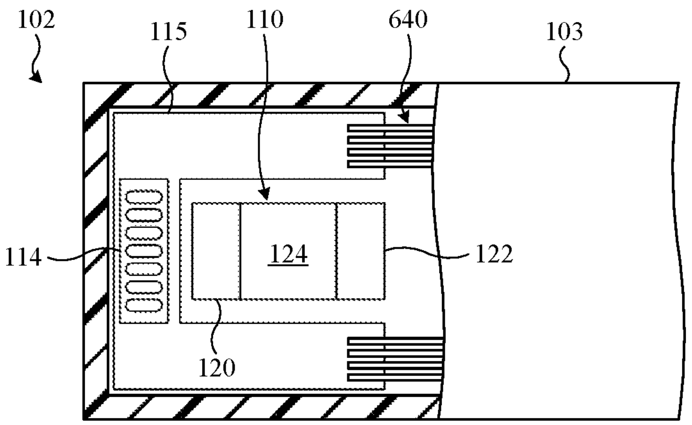
FIGS. 6A-6C are schematic partial cross-section illustrations showing examples of a circuit board of the connector.
Figure 6B:
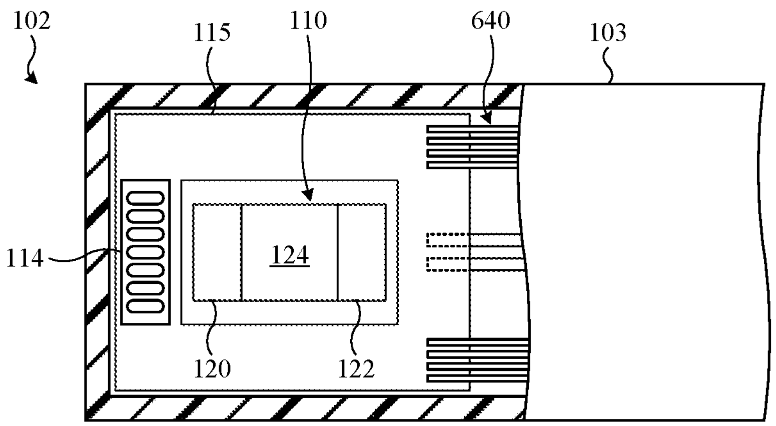
Figure 6C:
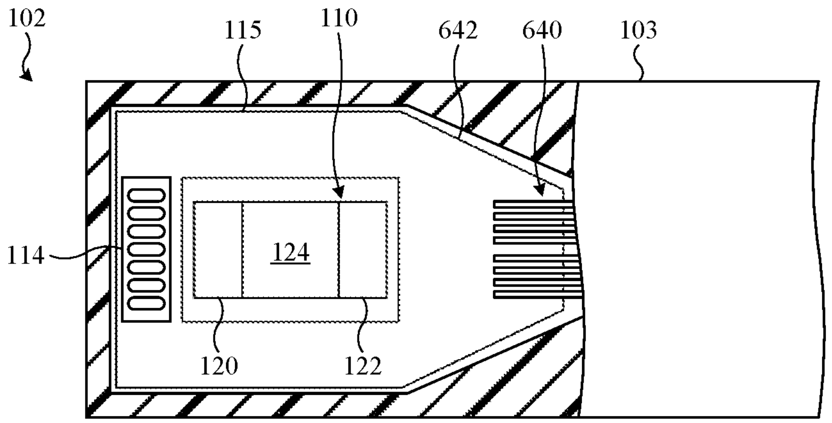

FIGS. 6A-6C are schematic partial cross-section illustrations of the accessory showing examples of the circuit board 115 of the connector. The circuit board 115 is located in the housing of the device 100, and may be a rigid circuit board (e.g., a printed circuit board), or may be a flexible circuit board. The circuit board 115 is connected to and supports the electrical contacts 114 of the connector 110 in order to facilitate connection of the electrical contacts 114 to the components 106 of the accessory 102 using conductors 640 that are connected to the circuit board 115. The conductors 640 may be located on a single side of the circuit board 115 or may be located on both sides of the circuit board 115 (e.g., upper and lower sides) in order to improve packaging and conform to the geometry of the housing 103 in particular implementations. The circuit board 115 may be located outward (e.g., laterally and longitudinally outward) relative to the recess 120, the release button 122, and the release mechanism 124 of the connector 110, to allow for compact and efficient packaging of the components of the connector 110 in the housing 103 of the accessory 102. In each of the implementations shown in FIGS. 6A-6C, the circuit board 115 includes an open portion that is located between first and second lateral side portions that are interconnected by a central portion that supports the electrical contacts. In FIG. 6A, the circuit board 115 has a u-shaped configuration, including a central portion that is connected to the electrical contacts 114 and side portions that are connected to the conductors 640, and are located on lateral sides of the recess 120, the release button 122, and the release mechanism 124, which are located within an open portion located an interior of the u-shaped configuration of the circuit board 115. In FIG. 6B, the circuit board 115 has a ring-shaped configuration, including outer portions that extends around an open interior portion where the recess 120, the release button 122, and the release mechanism 124 are located. In FIG. 6C, to transition from the relatively more rigid area of the accessory 102 including the connector 110 to a flexible area of the accessory 102 (e.g., in implementations in which the housing 103 is formed from a flexible material), the circuit board 115 includes a tapered portion 642. The tapered portion of the circuit board 115 is located longitudinally opposite the electrical contacts 114, is located near the connection of the conductors 640 to the circuit board 115, and is located adjacent to a flexible portion of the housing 103. In the tapered portion 642, the lateral width of the circuit board 115 decreases in correspondence with longitudinal distance from the release button 122 (e.g., as the distance from the release button 122 increases), which provides a better transition between rigid and flexible areas of the accessory 102 as opposed the terminating the circuit board 115 at full width. Thus, the connector 110 may include the circuit board 115, which is located in the housing 103, and is electrically connected to the electrical contacts 114, wherein the circuit board 115 includes the tapered portion 642, which is located adjacent to a flexible portion of the housing 103.

Figure 7:
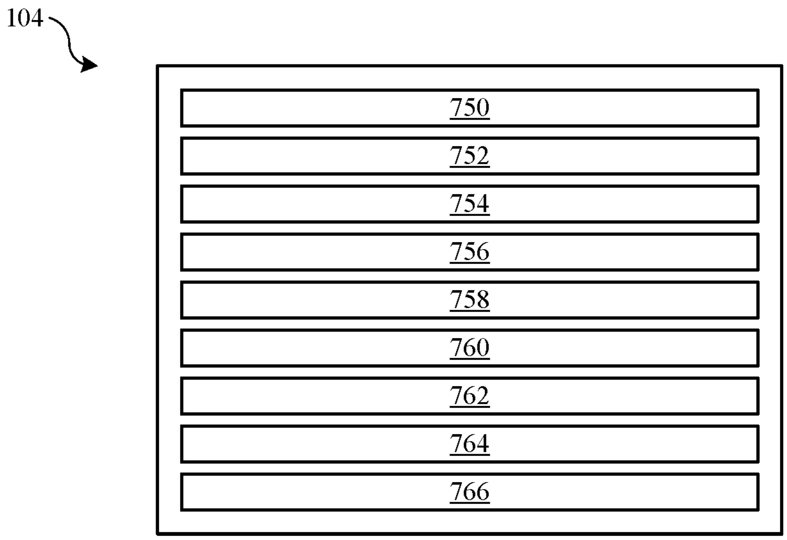
FIG. 7. is a block diagram of components of the device according to an example.

FIG. 7. is a block diagram of the components 104 of the device 100 according to an example. In the illustrated implementation, the components 104 of the device 100 include a processor 750, a memory 752, a storage device 754, a communications device 756, sensors 758, a power source 760, a display device 762, an optical system 764, and a facial interface 766. These components are optional, and different components may be included. In one implementation, some of these components may be omitted, included in the accessory 102 instead of in the device 100, or included in a separate device that communicates with the device 100 by a wired or wireless communications connection.

The processor 750 is a device that is operable to execute computer program instructions and is operable to perform operations that are described by the computer program instructions. Multiple processors 750 may be included to perform operations described by computer program instructions together. As examples, the processor 750 may include one or more central processing units, one or more graphics processing units, one or more application specific integrated circuits, and/or one or more field programmable gate arrays. The memory 752 is a high-speed information storage device such as one or more random-access memory modules. The memory 752 may store computer-executable program instructions that cause the processor 750 to perform specific functions as discussed herein. The storage device 754 is a non-volatile, long term data storage device that may store computer program instructions and other data. As examples, the storage device 754 may include a flash memory module, a hard drive, or a solid-state drive.

The communications device 756 supports wired or wireless communications with other devices according to any suitable wired or wireless communications protocol. The sensors 758 are components that are incorporated in the device 100 to generate sensor output signals that are used as inputs by the processor 750. In some implementations, the sensors 758 are used by the processor 750 to generate content, such as computer generated reality content, as will be described herein. As examples, the sensors 758 may include cameras, infrared cameras, infrared emitters, depth cameras, structured-light sensing devices, accelerometers, gyroscopes, magnetometers, buttons, switches, force sensors, and deformation sensors. The sensors 758 may also include biometric sensors that are operable to physical or physiological features of a person, for example, for use in user identification and authorization. Biometric sensors may support functions such as fingerprint scanning, retina scanning, and face scanning. The sensors 758 may also include components that facilitate motion tracking.

The power source 760 supplies electrical power to components of the device 100. In some implementations, the power source 760 is a wired connection to electrical power. In some implementations, the power source 760 may include a battery of any suitable type, such as a rechargeable battery. In implementations that include a battery, the device 100 may include components that facilitate wired or wireless recharging. In some implementations, the power source 760 may be omitted in favor of a power source that is associated with the accessory 102 and transfers electrical power to the device 100.

The display device 762 functions to display content to the user in the form of emitted light that is output by the display device 762 and is directed toward the user's eyes by the optical system 764. The display device 762 is a light-emitting display device, such as a video display of any suitable type, that is able to output images (e.g., in the form of an array of pixels each having a color and/or intensity value) in response to a signal that is received from the processor 750. As examples, the display device 762 may be implemented using a liquid-crystal display (LCD) device, a light-emitting diode (LED) display device, a liquid crystal on silicon (LCoS) display device, an organic light-emitting diode (OLED) display device, or any other suitable type of display device. The display device 762 may include multiple individual display devices.

The optical system 764 and, optionally, the facial interface 766, may be included in implementations in which the device 100 includes a near eye display that is configured to show content to the user from a location that is near the eyes of the user. In other implementations of the device 100 (e.g., a smart watch), the optical system 764 and the facial interface 766 are omitted.

The optical system 764 is associated with the display device 762 and is optically coupled to the display device 762. The device 100 is configured to position portions of the optical system 764 (e.g., lenses) near the user's eyes in order to direct emitted light from the display device 762 to the user's eyes in order to display content to the user. The optical system 764 may include lenses, reflectors, polarizers, filters, optical combiners, and/or other optical components.

In some implementations, the facial interface 766 is included to limit the amount of environmental light that reaches the user's eyes in order to enhance the presentation of content to the user. To block environmental light, the facial interface 766 is a compliant structure that extends around portions of the optical system, and may be configured to contact the user's face. In other implementations, the optical system 764 is configured to operate in conjunction with environmental light and the facial interface 766 is omitted.

Figure 8:
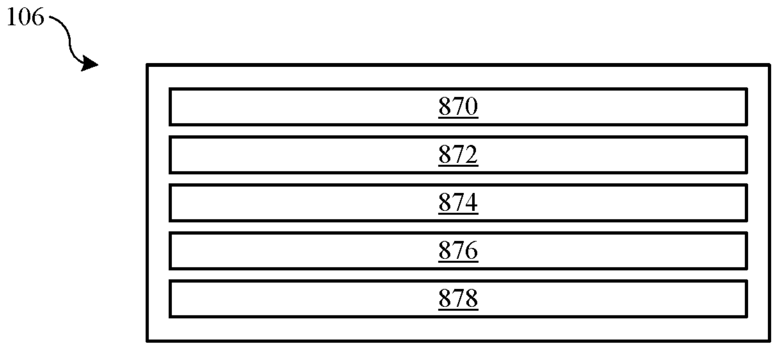
FIG. 8. is a block diagram of components of the accessory according to an example.

FIG. 8. is a block diagram of the components 106 of the accessory 102 according to an example. In the illustrated implementation, the components 106 may include, as examples, a wired power supply 870 (e.g., including a connection to an external battery or an electrical outlet), a battery 872, one or more sensors 874 (e.g., including any sensors described with respect to the sensors 758 of the device 100), audio input components 876 (e.g., a microphone), audio output components 878 (e.g., a speaker), and so forth.

In the description, terms such as "up," "down," "left," "right," "forward," and "rearward," are used for convenience and explanatory purposes to aid in understanding of the subject matter. It should be understood that described components are not necessarily limited to such positions or directions of movement.

As described above, one aspect of the present technology is operation of an electronic device, which may include the gathering and use of data available from various sources for use by the electronic device. As an example, such data may identify the user and include user-specific settings or preferences. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, a user profile may be established that stores information that allows operation of the electronic device to be customized according to the preferences of a user. Accordingly, use of such personal information data enhances the user's experience.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of storing a user profile for customization of operation of an electronic device, the present technology can be configured to allow users to select to "opt in" or "opt out" of participation in the collection of personal information data during registration for services or anytime thereafter. In another example, users can select not to provide data regarding usage of specific applications. In yet another example, users can select to limit the length of time that application usage data is maintained or entirely prohibit the development of an application usage profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, customizations may be made to operation of the electronic device by the user each time the electronic device is used, and without subsequently storing the information or associating the information with the particular user.

What is claimed is:

1. A connector, comprising:

a housing that defines a recess for receiving a latch member of a receptacle;

a release button that is operable to cause displacement of the latch member from the recess and has a surface that aligns with a surface portion of the housing when disconnected from the receptacle; and a release mechanism that operably connects the release button to an engaging part that is located in the recess, wherein the engaging part is actuated by the latch member when the connector is connected to the receptacle, and operation of the release button causes the engaging part to displace the latch member out of the recess, wherein the surface of the release button protrudes from the surface portion of the housing when the connector is connected to the receptacle to provide a visual indication that the connector is connected to the receptacle.

2. The connector of claim 1, wherein the surface of the release button is substantially planar, the surface portion of the housing is substantially planar, and the surface of the release button is flush with respect to the surface portion of the housing when the connector is disconnected from the receptacle.

3. The connector of claim 1, wherein the surface of the release button has a curved shape, and the surface portion of the housing has a complementary curved shape.

4. The connector of claim 1, wherein the recess is formed from metal so that engagement of the recess with the latch member of the receptacle produces an audible indication that the connector is connected to the receptacle.

5. The connector of claim 1, wherein the engaging part of the release mechanism is a cover that is connected to the housing, wherein the cover is configured to obstruct the recess, and the cover is displaced into the recess by the latch member of the receptacle when the connector is connected to the receptacle.

6. The connector of claim 5, wherein the cover is formed from metal so that displacement of the cover by the latch member causes an audible indication that the connector is connected to the receptacle.

7. The connector of claim 1, wherein the release mechanism includes a flexible connecting structure that extends through a flexible portion of the housing that is located between the recess and the release button, wherein the flexible connecting structure is configured to transfer movement between the engaging part and the release button.

8. The connector of claim 7, wherein the recess is rigid, and the housing includes a release housing portion that is rigid and supports the release button.

9. The connector of claim 1, further comprising:

electrical contacts that are located on the housing and configured for conductive engagement with the receptacle when the connector is connected to the receptacle.

10. The connector of claim 9, further comprising:

a circuit board that is located in the housing and is electrically connected to the electrical contacts, wherein the circuit board includes a tapered portion that is located adjacent to a flexible portion of the housing.

11. A connector, comprising:

a housing that includes a flexible portion and defines a recess for receiving a latch member of a receptacle;

a release button; and a release mechanism having a flexible connecting structure that extends through the flexible portion of the housing and operably connects the release button to an engaging part that is configured to displace the latch member from the recess upon operation of the release button.

12. The connector of claim 11, wherein the flexible connecting structure includes a cable.

13. The connector of claim 11, wherein the flexible connecting structure includes a flexible sheet material.

14. The connector of claim 11, wherein the recess is rigid, and the housing includes a release housing portion that is rigid and supports the release button.

15. The connector of claim 11, wherein the flexible connecting structure is configured to transfer movement between the engaging part and the release button.

16. The connector of claim 11, wherein the engaging part is displaced by the latch member when the connector is connected to the receptacle.

17. The connector of claim 11, wherein the engaging part of the release mechanism is a cover that is connected to the housing, wherein the cover is configured to obstruct the recess, and the cover is displaced into the recess by the latch member of the receptacle when the connector is connected to the receptacle.

18. The connector of claim 11, further comprising:

electrical contacts that are located on the housing and configured for conductive engagement with the receptacle when the connector is connected to the receptacle.

19. A connector, comprising:

a housing that defines a recess for receiving a latch member of a receptacle;

a release button that is operable to cause displacement of the latch member from the recess and has a surface that aligns with a surface portion of the housing when disconnected from the receptacle; and a release mechanism that operably connects the release button to an engaging part of the release mechanism that is located in the recess, wherein the engaging part is actuated by the latch member when the connector is connected to the receptacle and actuation of the engaging part causes the surface of the release button to protrude from the surface portion of the housing to provide a visual indication that the connector is connected to the receptacle.

20. The connector of claim 19, wherein the surface of the release button is substantially planar, the surface portion of the housing is substantially planar, and the surface of the release button is flush with respect to the surface portion of the housing when the connector is connected to the receptacle.

21. The connector of claim 19, wherein the surface of the release button has a curved shape, and the surface portion of the housing has a complementary curved shape.

22. The connector of claim 19, wherein a flexible portion of the housing is located between the recess and the release button, and the release mechanism includes a flexible connector that extends through the flexible portion of the housing.

23. The connector of claim 22, further comprising:

electrical contacts that are located on the housing and configured for conductive engagement with the receptacle when the connector is connected to the receptacle; and a circuit board that is located in the housing and is electrically connected to the electrical contacts, wherein the circuit board includes an open portion that is located between first and second lateral side portions that are interconnected by a central portion that supports the electrical contacts.

24. The connector of claim 19, wherein the recess is formed from metal, and the latch member is formed from metal so that engagement of the recess with the latch member of the receptacle causes an audible indication of connection of the connector to the receptacle.

* * * * *